March 3, 1942.   P. W. GAENSSLE   2,274,860
BRAKE MECHANISM
Filed June 11, 1940
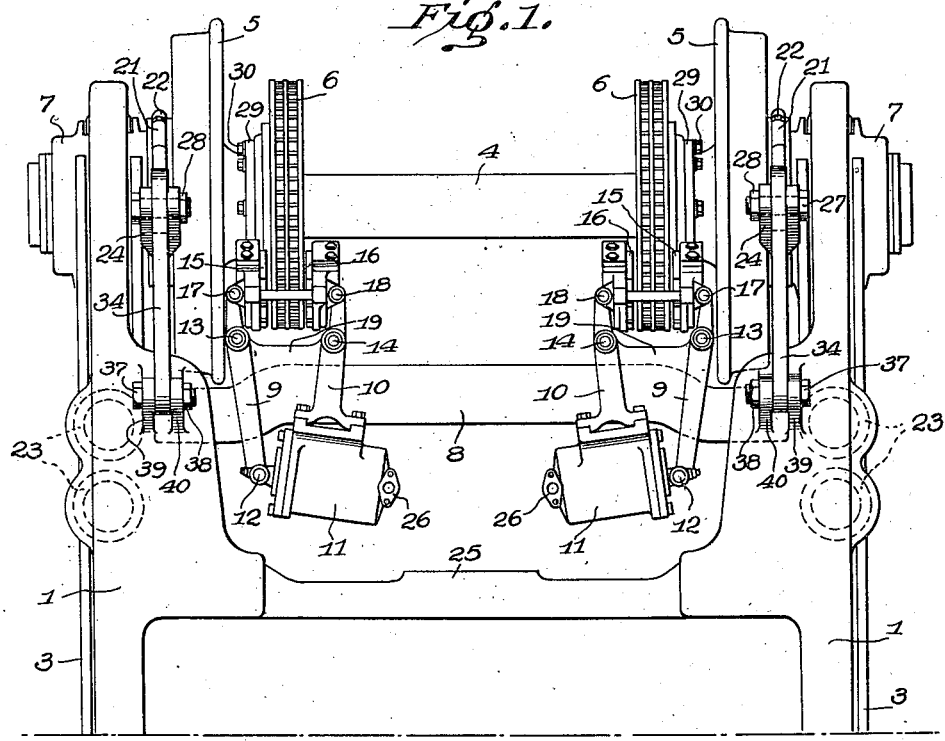
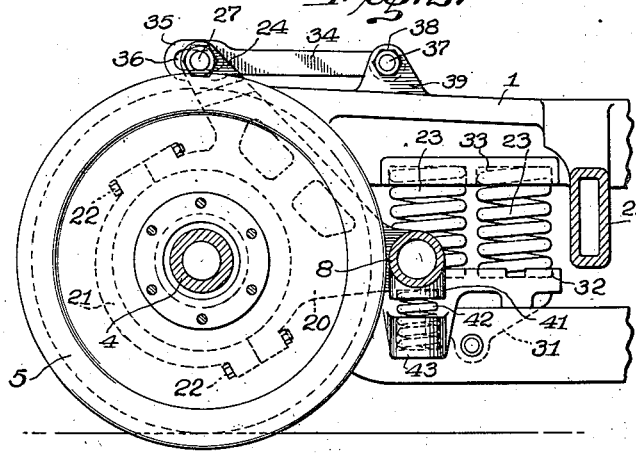
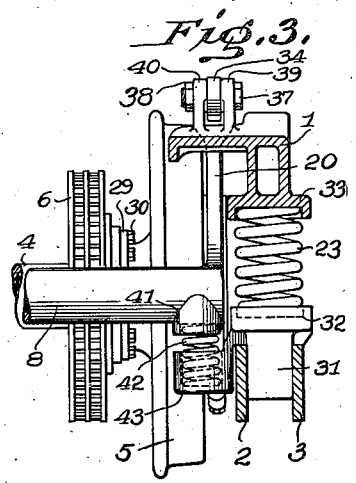
INVENTOR
Paul W. Gaenssle
BY John P. Tarbox
ATTORNEY Patented Mar. 3, 1942

2,274,860

UNITED STATES PATENT OFFICE 2,274,860

BRAKE MECHANISM

Paul W. Gaenssle, Detroit, Mich., assignor to Budd Wheel Company, Philadelphia, Pa., a corporation of Pennsylvania Application June 11, 1940, Serial No. 339,845

7 Claims. (Cl. 188—59)

The present invention relates to brakes.

More specifically, it relates to brakes of the so-called disk type, particularly that form wherein the brake cylinders and brake shoes are carried by a yoke or C-frame, and may be considered to relate to a modified form of the brake mechanism disclosed in the copending application of C. L. Eksergian, Serial No. 321,688, filed March 1, 1940, now Patent No. 2,253,268, issued August 19, 1941.

In said prior case, the rear end of the torque arm of the brake supporting yoke moves between two fixed buffers made of rubber or the like, and is additionally supported by a relatively low rate spring. In the present form, such spring is retained and carries the normal load produced by the brake yoke and consisting mainly of the weight of the mechanism, but a rigid stop is substituted for the yieldable buffer below the end of the torque arm, while a further rigid member, in the form of a link pivotally mounted on the wheel truck frame and extending in a direction such as to have substantially no effect upon the springing of the frame, takes most of the load produced when the brakes are engaged.

Other objects and features of the invention will be evident from the present specification, descriptive of a preferred embodiment of the same, and the drawing accompanying it and forming a part thereof.

In said drawing:

Fig. 1 is a diagrammatic fragmentary plan view, showing approximately one-half of a wheel truck, including brake mechanism embodying the invention;

Fig. 2 is a diagrammatic fragmentary side elevation corresponding to Fig. 1; and Fig. 3 is a diagrammatic fragmentary detail, partly in section on the plane indicated by the line 3—3 shown on Figs. 1 and 2.

In all the figures, similar elements are designated by the same reference characters.

The wheel truck, having the side frames 1, is supported resiliently from the equalizer bars 2 and 3 by helical springs 23 interposed between said bars and the side members 1 of the said frame, suitable supports 31 being mounted on the equalizer bars and having recesses 32 therein to receive and retain the lower ends of the said springs, while corresponding upper recessed members 33 are provided on the side frames, to receive and retain the upper ends of the springs. The side frames 1 may be connected by the cross members 25 constituting the transom.

The truck carries the axles 4, having thereon the wheels 5 and brake rings 6, said rings being secured to the hub flanges 29 by bolts or the like 30. The ends of each axle 4 are mounted in the journal boxes 7. Mounted upon the inner end of each journal box 7, so as to pivot about the axis of the axle 4, is the corresponding supporting bracket 20 forming part of the C-frame or brake yoke.

Said brackets 20 are rigidly attached to the opposite ends of the tubular cross piece 8 which carries part of the brake mechanisms, each of which is here shown as comprising a cylinder 11 mounted on a lever 10 pivotally held at 14 on a flange 19 of the cross member 8, the short forward arm of said lever 10 being pivotally attached at 18 to a brake shoe 16. Said mechanism further comprises another lever 9 that is pivotally mounted at 13, and pivotally attached at 12 to the piston rod of the cylinder 11, the short arm of lever 9 being pivotally secured at 17 to a brake shoe 15, the said brake shoes being placed on opposite sides of the brake ring 6, so that when the piston is forced out of the cylinder by supplying pressure fluid through the port 26, the brake shoes will be forced against the opposite faces of the ring 6.

Each bracket 20 has a semi-circular end engaging around the journal box 7 and cooperating with a strap 21 to complete a circular bore, said strap being secured to the bracket 20 in any suitable way, as by the bolts 22.

As so far described, the brake yoke or C-frame comprising the brackets 20 and the cross member 8 could rotate freely about the journal boxes. In order to prevent such rotation, except for a desirable small range of the same, each bracket 20 may have at its upper end a forked portion 24 having therein an aperture through which passes a pin or bolt 27, with a nut 28 thereon. A rigid link 34, having an enlarged end 35 with a slot 36 formed therein, is engaged over said pin 27 as shown in Fig. 2. The other end of the link 34 is pivotally supported by another pin or bolt 37, which passes through upstanding lugs 39 and 40 secured to or integral with the side frame 1, and is secured by the nut 38. It will be noted that the link extends in a direction generally normal to the axes of the springs 23 supporting the frame, and thereby the braking torque is transmitted to the frame in a direction having substantially no effect upon the springing of the frame.

The cross member 8 may have a recessed member 41, thereon, adapted to receive the upper end of a helical spring 42, the other end of which is carried in a cup 43 secured to the support 31 and offset therefrom as shown best in Figs. 2 and 3. The spring 42 is a relatively low rate spring, the function of which is to support merely the unbalanced weight of the brake yoke, whenever the brake is not engaged. It will be noted that the slot 36 in each link 34 allows free movement of the bracket 20 through a limited range, that is, until the bolt 27 engages one end or the other of the said slot, whereupon further rotation of the bracket 20 is prevented by the rigid link 34.

The operation of the brake mechanism will be obvious from the structures disclosed. Briefly it may be summarized as follows:

When the vehicle is in motion, with the brakes out of engagement, the unbalanced portion of the weight of the brake actuating mechanism, that is, the cross member 8, brake cylinders 11, etc., will be carried by the low rate spring 42 which will serve to hold the cross piece 8 in an intermediate position wherein each bolt 27 is not in engagement with either end of the slot 36 in the corresponding link 34. In this condition said weight is resiliently supported by the low rate springs 42 and the brake mechanism thus is not subjected to such minor shocks and vibrations as would otherwise act thereon during travel of the vehicle, thus increasing its freedom from derangement and injury, and also making it more suitable to use with certain auxiliary devices.

When pressure medium is introduced into the cylinders 11 through the ports 26, the piston rod of each cylinder will be forced outward by the piston, while the cylinder itself will move in the opposite sense, thus actuating the levers 9 and 10 in opposite directions so as to force the brake shoes 15 and 16 against the opposite faces of the corresponding brake ring 6.

Due to the frictional force thus produced, the brake rings will tend to carry the cooperating brake shoes along in the direction of rotation of the wheel. If the vehicle is traveling toward the right, the bracket 20, shown in Fig. 2, will move downward, first compressing the spring 42, but soon being held by the bolt 27 coming into engagement with the right hand end of the slot 36 in link 34, whereupon said link will stop any further rotation of the brake mechanism about the axis of the axle 4, the resisting force being transmitted through the link 34 to the bolt 37, mounted in the lugs on the side frame.

If on the other hand, the vehicle is traveling toward the left in Fig. 2, the member 41 will be lifted, thus allowing the spring 42 to expand until finally the pivot bolt 27 engages the left hand end of the slot 36 of link 34. Here again the link 34 will stop any further turning of the bracket about its axis, the link in this case being stressed in tension and pulling against the bolt 37.

Thus, regardless of the direction of rotation of the wheels, the resultant produced by the braking action will be transmitted directly to the side frame, which is, of course, amply strong enough to withstand the same.

It will therefore be seen that the present invention provides a very simple and rugged brake mechanism, which differs from that of the copending case in applying the resisting force for counteracting rotation of the brake yoke directly to the side frames.

While the invention has been disclosed herein by reference to a specific embodiment thereof, at present believed to be a preferred form, it should be clearly understood that such illustration is more or less arbitrary and is highly diagrammatic. Certain details may be added or others modified and still others may be removed entirely without departing from the invention, which is defined solely by the following claims.

I claim:

1. In a wheel truck, a brake mechanism comprising a rotatable brake element, a brake shoe cooperating therewith, means for actuating said brake shoe, a yoke supporting said actuating means, said yoke being pivotally supported about an axis substantially in alinement with the axis of the brake element, a low rate spring carried by the truck and cooperating with said yoke to support it when the brake shoe is not engaged with the brake element, and a rigid link pivoted at one end to the truck and having an elongated opening at its other end, a portion of the yoke being engaged in said opening and thus providing a certain amount of play, to limit the rotary motion of said yoke when the brake shoe engages the brake element.

2. In a wheel truck, a brake mechanism comprising a rotatable brake element, a brake shoe cooperating therewith, means for actuating said brake shoe, a yoke supporting said actuating means, said yoke being pivotally supported about an axis substantially in alinement with the axis of the brake element, a low rate spring carried by the truck and cooperating with said yoke to support it when the brake shoe is not engaged with the brake element, and a rigid link pivoted at one end to the truck and at its other end having an opening, the yoke having a portion extending through said opening but of smaller size than the latter, the link thus permitting lost motion but thereafter forming a non-yielding stop for the yoke, to prevent further rotary motion of said yoke when the brake shoe engages the brake element.

3. In combination in a truck, wheel and axle means, equalizer bar means, a frame, means for yieldably supporting the frame on the equalizer bar means in floating relation thereto, brake drum and shoe means, means mounted on the wheel and axle means for carrying the brake shoe means, means on the equalizer bar means providing cushion support for said carrying means, and means whereby braking force transmitted to the frame is constrained to act in predetermined direction to avoid affecting the frame in its direction of float.

4. In combination in a truck, wheel and axle means, equalizer bar means, a frame, means for yieldably supporting the frame on the equalizer bar means in floating relation thereto, brake drum and shoe means, means mounted on the wheel and axle means for carrying the brake shoe means, means on the equalizer bar means providing a cushion support for said carrying means, said carrying means normally tending to float on said cushioning means and, under braking action, to move relative thereto in one or the opposite direction depending upon the direction of rolling of the truck, and means including rigid means linked between said frame and shoe means in lost-motion relation thereto normally thereby providing for said floating movement of said carrying means on said cushioning means and directing the braking force at the end of the lost motion in each direction relative to the frame to avoid affecting the latter in its direction of float.

5. In a wheel truck, a wheel and axle assembly, a truck frame sprung therefrom, a brake support sprung independently of said truck frame, a low rate springing means for said support, a connection between said brake support and frame independent of the springing means of said support for transmitting the braking torque to said frame and in a direction having substantially no effect upon the springing of the frame, said connection having lost motion permitting free action of the springing means of the support when the brakes are not applied.

6. In a wheel truck, a wheel and axle assembly, a truck frame sprung from said assembly, a rotary braking element associated with a wheel of said assembly, a non-rotary braking element for cooperation with said rotary element to apply the brakes, a support for said non-rotary element, cushioning means for carrying a part at least of the load of said support and means connecting said support to the frame to transmit the braking torque to the frame in a direction not materially effecting the springing of the frame, said connecting means having lost motion permitting movement of the support on its cushioning means in the normal operation of the truck when the brakes are not applied.

7. In a truck, a wheel and axle assembly, equalizer bars supported therefrom, and a truck frame sprung from said equalizer bars and having pedestal guides coacting with said wheel and axle assembly, a brake support carried by said wheel and axle assembly and equalizer bars, cushioning means interposed between said support and bars, connections between said support and frame for transmitting braking torque to said frame in a direction having substantially no effect upon the springing of said frame from the equalizer bars, and lost motion in said connections to permit free action of the cushioning means when the brakes are not applied.

PAUL W. GAENSSLE.